United States Patent Office 2,778,423
Patented Jan. 22, 1957

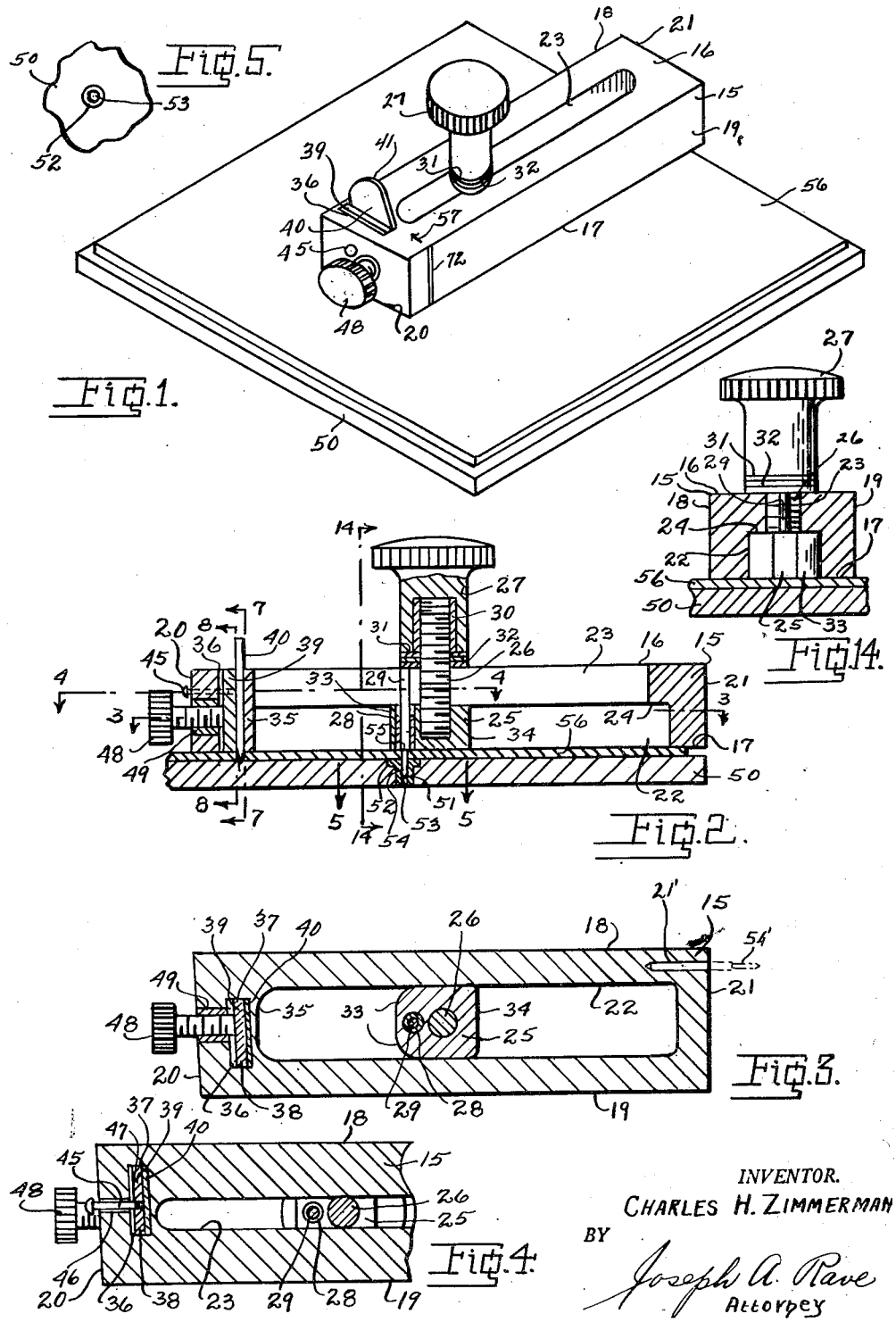

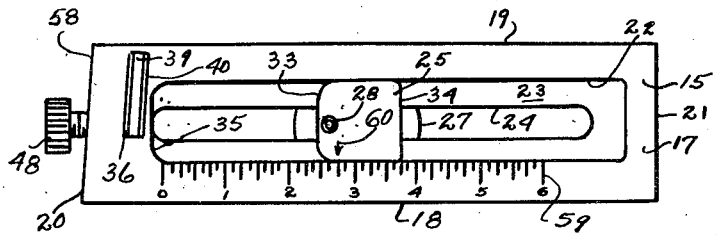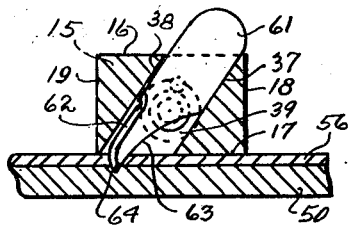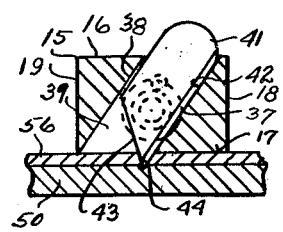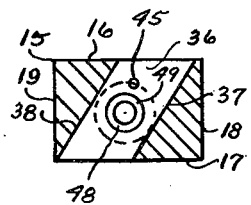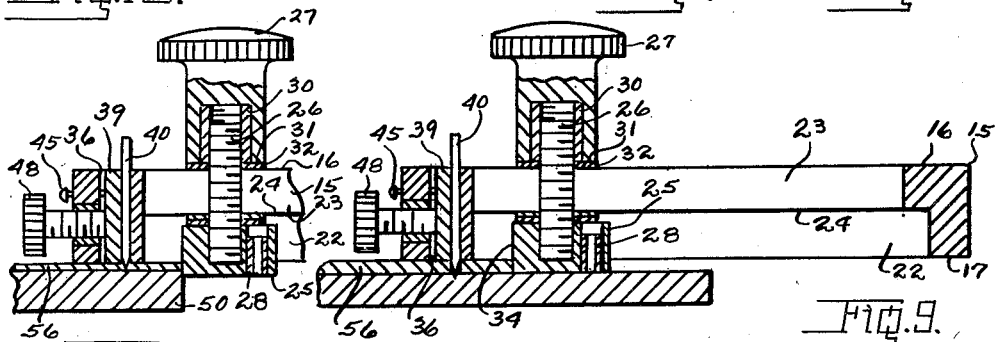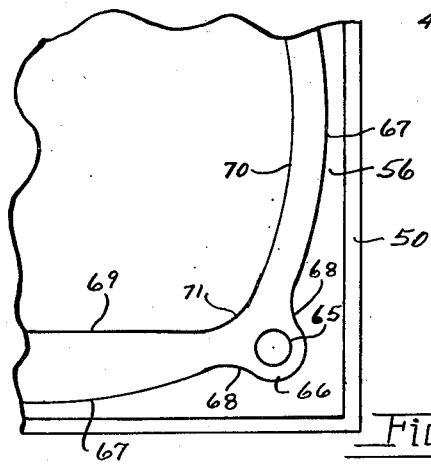

2,778,423

CUTTING IMPLEMENT ADAPTED FOR THE CUTTING OF CIRCLES

Charles H. Zimmerman, Norwood, Ohio, assignor to Zimmerman Packing Company, Norwood, Ohio, a corporation of Ohio Application July 22, 1949, Serial No. 106,217

3 Claims. (Cl. 164—71)

This invention relates to improvements in a cutting implement or tool particularly adapted for the cutting of circles, discs, arcs, strips and irregular edges in sheet material such as card board, paper, gasket material and any material capable of being cut by a relatively thin keen edge blade under such pressure as may be applied by a user's hand.

The cutting implement or tool of the present invention is an improvement on that disclosed in United States Patent 2,134,069.

The cutting implement or tool of the present invention discloses a simplification in construction over that in the above identified patent and the tool of the present invention is capable of performing cutting operations not contemplated by that of the patent.

An object of this invention is the provision of a cutting implement or tool that is simple in construction whereby it may be adjusted for performing different operations without using other tools in effecting such adjustments.

Another object of this invention is the provision of a cutting implement or tool that is light in weight so that it can be readily and expeditiously handled in performing cutting operations in making discs of very small radii, circular holes or openings in sheet material which have very small radii, and can be employed in cutting strips with parallel edges or can be readily employed to follow irregular lines or paths and can reproduce said irregular lines inwardly thereof or parallel to one another.

It is also an object of this invention to provide a cutting tool that will accomplish the foregoing objects that is superior to cutting implements or tools heretofore known and employed.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a perspective view of the cutting implement or cutting tool of the present invention showing same in the act of being used.

Fig. 2 is a longitudinal vertical sectional view through the tool of the present invention including the cutting board with which it is used.

Fig. 3 is a horizontal sectional view through the cutting tool as seen from line 3—3 on Fig. 2.

Fig. 4 is a fragmentary horizontal sectional view through the cutting tool of the present invention taken through a plane above that of Fig. 3 on line 4—4 on Fig. 2.

Fig. 5 is a fragmentary plan view of a portion of the cutting board as seen through line 5—5 on Fig. 2.

Fig. 6 is a bottom plan view of the cutting tool of Figs. 1 and 2.

Fig. 7 is a transverse sectional view through the cutting tool and board as seen from line 7—7 on Fig. 2.

Fig. 8 is a view similar to that in Fig. 7 without the blade for more clearly illustrating the construction of the tool, as seen from line 8—8 on Fig. 2.

Fig. 9 is a longitudinal sectional view through the cutting tool as illustrated in Fig. 2 except that the tool has been adjusted for cutting strips instead of circular holes or discs.

Fig. 10 is a fragmentary sectional view illustrating the parts in substantially the same position as in Fig. 9 but with the tool being employed in connection with the cutting board instead of with the material being cut as illustrated in Fig. 9.

Fig. 11 is a perspective view of the cutting tool of the present invention as seen from the underside thereof and adapted to performing a cutting through an irregular path.

Fig. 12 is a view similar to Fig. 7 taken on line 12—12 on Fig. 11 and illustrating the blade particularly adapted for following irregular lines.

Fig. 13 is a fragmentary plan view of a portion of a piece of sheet material marked to be cut to irregular and regular form and illustrating an example of work to be done by the cutting tool of the present invention.

Fig. 14 is a vertical transverse sectional view of the cutting tool as seen from line 14—14 on Fig. 2.

Throughout the several views of the drawings similar reference characters are employed to denote the same or similar parts.

The cutting tool of the present invention comprises a body member 15 including a top 16, bottom 17, longitudinal sides 18 and 19, head end 20, and rear end 21. As shown in Fig. 1 the body member 15 is substantially an elongated block rectangular in cross-section and is formed or molded as a single unitary member. The body member may be formed of any suitable or desirable material but is preferably of the synthetic resin material popularly known as plastics.

The body member 15 is provided longitudinally thereof inwardly of the bottom 17 with a slot 22 that communicates with an elongated aperture 23 longitudinally of the body member from the top 16. The slot 22 is of greater width than that of the aperture 23 whereby there is provided at the upper end of the slot 22 a shoulder 24, see particularly Fig. 14.

Disposed in the slot 22 is a pivot block 25 preferably molded of synthetic resin or plastic and having imbedded therein and projecting therefrom a locking screw 26. The screw 26 extends through the elongated aperture 23 to stand above the body member top 16 for receiving locking or clamping nut 27.

To one side of the locking screw 26, the pivot block 25 has imbedded therein a metal sleeve 28, it being understood that if the pivot block 25 is formed of metal or other material that is not easily chipped or subject to rapid wear, the sleeve 28 would take the form of an aperture in the block. Centrally of the sleeve 28 there is the centering pin 29 operable for a purpose subsequently to be made clear.

The locking or clamping nut 27 is again preferably formed of synthetic resin or plastic for which reason it has therein a metallic sleeve 30 internally threaded to receive the threads of the screw 26. Disposed between the lower flat face 31 of the locking or clamping nut 27 and the top 16 of the cutter body are a plurality of washers 32 which may serve a dual purpose as will presently be described. It will be noted from Fig. 2 that the diameter of the nut 27 and washers 32 is such as to substantially overlie the pivot block sleeve 28 and therefore act as an abutment for the centering pin 29, as clearly illustrated in said Fig. 2.

In operation the pivot block 25 is made to a dimension substantially equal to the transverse dimension of the slot 22 wherefore it may be readily slid longitudinally of the said slot and engages on its upper surface with the shoulder 24 of said slot. The locking or clamping nut 27 secures the pivot block 25 in position by drawing its upper face against the shoulder 24 and clamping said shoulder between the said pivot block upper face and the flat face 31, or washers 32, of the locking or clamping nut. The pivot block 25, see Fig. 3, has its one end substantially rounded as at 33, for a purpose subsequently to be made clear, while the other or rear end of the said pivot block has a substantially straight or normal face 34. In order that the pivot block 25 may very closely engage with the head end 20 of the body, the end 35 of the slot 22 is rounded to substantially the same contour as the front end 33 of the pivot block 25.

Formed in the head end 20 of the cutter body 15 is an inclined passageway 36 shown most clearly in Figs. 7, 8 and 12. As will be seen the passageway 36 has one side 37 breaking through the upper or top 16 of the body member 15 at substantially the corner thereof where the side 18 and top 16 meet, while the other side 38 of the said passageway 36 breaks through the bottom 17 of the body member 15 at substantially the corner formed by said body member bottom 17 and side 19. The width of the passageway 36 is such that the side 37 thereof breaks through the bottom 17 at substantially the transverse midpoint of the said body member 15 for a purpose that will be presently made clear. Disposed in said passageway 36 is a metal clamping member 39 somewhat thinner than the depth of the slot 36 which is adapted to have disposed between itself and one vertical face of the said passageway 36 a blade 40.

It is contemplated that various blades may be employed there being two different blades illustrated in the drawings, one in Fig. 7 and the other in Fig. 12. The blade illustrated in Fig. 7 is for use in forming discs, arcs, circles and the like when the centering pin 29 is employed and will be described in detail at this time. The blade 41 is of a width to slidably fit between the sides 37 and 38 of the passageway 36 and of a major length somewhat greater than the said passageway so that the upper end thereof may project above the top 16 of the cutter body to be grasped by the user in adjusting the blade longitudinally of the passageway for more or less projecting the lower end of the blade below the body member bottom 17. As will be seen in Fig. 7 the blade 41 is provided along one longitudinal edge with a reduced portion to form the keen edge 42 and the blade has its lower end sharply cut back as at 43 thereby supplying to the blade a keen point 44 which is employed for doing the actual cutting of the material as will subsequently be made clear. The blade is retained in its adjusted positions through the clamping block 39.

In order to facilitate the adjustment and clamping of the blade 41 the clamping block 39 is held in the passageway 36 against inadvertent displacement longitudinally of the passageway while permitting free movement transversely thereof in a clamping and unclamping direction. Any suitable or desirable means may be employed for retaining the clamping block in position, that shown in the drawings, see particularly Fig. 4, comprising a pin 45 which passes through a slightly larger aperture 46 in the head end 20 of the body member and which pin has its inner end 47 substantially tightly pressed into an aperture in the clamping block 39. The clamping block 39 is moved to a clamping position by a thumb screw 48 threaded into a metal sleeve 49 imbedded in the head end of the body member 15.

The operation of the clamp block is believed obvious since a rotation of the thumb screw in a clockwise direction will cause same to move axially to the right, as seen in Fig. 2, and since its inner end impinges on the clamp block 39 will correspondingly move said clamp block for clamping engagement with the blade 40 and thereby effect its clamping in the desired position after the said blade has been axially adjusted through the passageway 36.

The cutting implement or tool of this application is adapted to be employed with a cutting board 50 of relatively soft material so as not to unduly dull the sharp corner 44 of the blade while in use. Substantially centrally of the board 50 there is provided a metal ferrule 51 imbedded in said board and prevented from being inadvertently pushed through the board by a radial flange 52 at the upper end thereof. The ferrule has an aperture 53 therein considerably smaller in diameter than the diameter of the centering pin to receive a reduced pointed end 54 on said centering pin 29. By this construction there is provided between the reduced end 54 and body portion of the pin 29 a shoulder 55 that prevents the pin from being inserted entirely through the gasket material as will be clear from Fig. 2.

The material to be cut is disposed on the upper surface of the cutting board 50 and is indicated by the reference numeral 56.

As was noted above, the cutting implement or tool of the present invention is adapted for cutting sheet material of various kinds which may vary in thickness from thin paper to comparatively heavy gasket material of upward of one-eighth inches in thickness. The blade 41 is adjusted longitudinally of the passageway 36 so as to project its cutting point 44 below the bottom 17 of the body member an amount just slightly in excess of the thickness of the material to be cut, that is, the cutter point 44 is to project from the body member 15 an amount that will completely penetrate the material being cut except where excessively thick material is being cut in which case it may be necessary, due to the thinness of the blade and the probable flexing of the blade during use with excessively thick material, to make two or more longitudinal adjustments of the cutter blade and cut the material in steps or in stages. The pivot block 25 is then adjusted toward and from the head end 20 of the body member to the radius of the arc, disc or aperture to be cut, this distance being measured from the point of the cutter blade 41 to the center of the centering pin 29, and the said pivot block secured or locked in this position by the locking or clamping nut 27.

The centering pin reduced portion 54 is now forced through the material at the point around which the arc, disc, or aperture is to be cut. The said reduced portion 54 is forced through the material until the shoulder 55 of the centering pin engages the upper surface of the material 56 whereupon the portion of the pin projecting below the material is disposed in the aperture 53 of the cutting board ferrule 51. The cutting implement or tool is now placed in position by lowering the same over the centering pin 29, that is, inserting the centering pin in the sleeve or aperture 28 in the pivot block 25. The cutting implement or tool is now pressed home to force the cutter blade point through the material whereupon the cutting implement or tool is actuated in a clockwise direction or in the direction of the arrow 57 formed on the top 16 of the body member 15 until a complete revolution around the centering pin has been made.

When cutting tough material such as fibre, hard pressed asbestos, and similar hard material, it is difficult to force the point or reduced portion 54 of the centering pin through said material and to assist in this the body member 15 has let into it from its rear end 21 a socket 21' to receive the body portion of the centering pin and have said reduced portion 54 projecting as shown in phantom lines at 54' in Fig. 3. The body 15 is now used as a handle in forcing the pin through the material to be cut.

The operation of the cutting implement or tool is in a circular path around the axis of the centering pin 29 and in order to reduce lateral rust on the cutter blade point 44 the head end 20 of the body member is disposed at a slight receding angle to the longitudinal axis thereof with the passageway 36 through this head end substantially parallel with said receding face and which angularity of the passageway, transversely of the body member, is clearly illustrated in Fig. 6 of the drawings by the reference numeral 58. The purpose for this angularity is to permit the said cutter point to more readily follow the circular path and produce a clean sharp cut instead of a probable jagged cut as would result from a blade disposed tangent to a circular path of movement thereof.

In order to assist in positioning the pivot block during the adjustment thereof relative to the body member 15, the said body member bottom 17, to one side of the slot 22 therein, is provided with graduations 59 that cooperate with a mark or pointer 60 on the pivot block. The graduations or scale 59 may be full size but is preferably made to half scale wherefore the diameter of the disc or aperture may be used in setting up the cutting implement or tool rather than the radius.

The cutting implement or tool is adapted for cutting strips of material with parallel edges but in order to do so use is made of the cutting blade 61 illustrated in Fig. 12. This blade as will be noted has its keen edge 62 oppositely disposed from the keen edge 42 of the blade 41 as illustrated in Fig. 7, and is further modified by having a sharper cut back as at 63 wherefore a relatively long thin cutting point or nose 64 results.

In using the cutting implement or tool for strip cutting the pivot block 25 is reversed from the position shown in Figs. 3 and 6 so that the straight or normal face 34 of the block 25 is toward the head end 20 of the body member 15. At the same time the pivot block 25 is lowered so that it projects below the bottom 17 of the body member and in order to effect this projection of the pivot block, and depending upon the thickness of the material to be cut, one or more of the washers 32 is removed from above the body member 15 and are placed between the pivot block 25 and the base or shoulder 24 of the slot 22 as illustrated in Figs. 9 and 10. The material to be cut or stripped is placed on the cutting board 50 inwardly of an edge thereof and after adjustment of the pivot block relative to the blade 61, the cutting implement or tool is positioned to have the face 34 of the pivot block against the edge of the material and the cutting point 64 of the blade 61 forced through the material whereupon the cutting implement or cutter is acuated relative to the material using the edge thereof engaged with the pivot block face 34 as a guide, as illustrated in Fig. 9. In the event the material is of such thinness that its edge cannot be conveniently used as a guide, the said material is placed on the cutter board with one edge thereof in coincidence whereupon the said edge of the material and edge of the cutter board are simultaneously used as the guide in cutting strips, all as illustrated in Fig. 10.

In Fig. 13 there is illustrated a gasket of irregular form which has been marked out on the upper surface of the material 56 and disposed on the cutting board 50. As there shown the gasket is to have an aperture 65 for a clamping bolt which is to be formed in a projecting ear 66 of the material. The sides 67 of the gasket are formed to a curved formation which may be generated about an axis outside of the material or to no particular radius but merely generally arcuately shaped with the ear 66 joined on opposite sides by an arcuate fillet 68 with the sides 67 of the gasket. The gasket is to have an opening therein one side of which opening may be a straight line, as at 69, while another side, as at 70, of said opening may be parallel with the outer edge of the gasket or at least formed to an arcuate shape that may have its center again outside of the material or area occupied by the complete gasket. The said sides 69 and 70 of the aperture are joined by an arc 71 for completing the corner of the gasket opening.

This gasket may have the bolt hole 65, exterior edge of the ear 66, fillets 68 and the arc 71 formed by the cutting implement or tool of the present invention with the parts in their normal positions as illustrated in Figs. 2, 3, 4, 6, 7 and 14 and by utilizing the said cutting implement or tool as above pointed out in connection with these figures. The straight side or sides 69 of the gasket opening may be formed with the parts adjusted to the positions illustrated in Figs. 9, 10 and 12 utilizing either the edge of the material 56 or the edge of said material and edge of the board simultaneously as a guide while effecting the said cut.

In order to form the arcuate sides 67 of the gasket the pivot block 25 and clamping nut 27 may be entirely removed from the body member 15 so that the cutting implement or tool is then as illustrated in Fig. 11 whereupon the blade point 64 is forced through the material at some point along the line 67 and the cutting implement and tool drawn toward the user while holding the blade on the said line 67. In order to assist the user in following the line 67 the body 15 has formed in its side 17 a mark, preferably a groove 72, which indicates exactly where the said cutter blade point 64 projects and if the operator or user causes said mark 72 to track on the line 67 his resulting cut will correspond exactly with said line 67. The side 70 of the gasket opening may be formed in the same manner as the outer side 67 is formed or, since the opening side 70 and outer side 67 are parallel, the said gasket outer side 67, after having been formed, may be used as a guide in the same manner that strips are cut from the material and as above described in connection with Fig. 9. In using the pivot block 25 as a guide for following an arcuate or irregular line the said pivot block is reversed from the position illustrated in Fig. 9 to its normal position as illustrated in Figs. 2, 3 and 6, that is, using the rounded edge 33 of the pivot block as the guide, with, of course, the lower end of said pivot block projected below the bottom 17 of the body member as illustrated in Figs. 9 and 10.

The foregoing description has contemplated the use of the cutting board 50 but it is readily understood that any bench or table top may be employed as the cutting surface requiring merely the imbedding therein of a ferrule, such as 51, so as to provide a bearing for the centering pin 29.

From the foregoing it will be seen that the cutting implement or tool of the present invention can be readily employed for cutting circular and rectangular apertures as well as apertures having sides that are arcuate or irregularly shaped. The cutting implement or tool may be employed for making or cutting discs, rectangles and strips with parallel or normal edges and in which either the edge of the material is used for a guide edge, or the cutting implement or tool of the present disclosure may be further employed for following irregular lines and may be adequately guided by said lines during the cutting of the material to the contour or configuration as delineated by said lines. It will further be noted that the cutting implement or tool otherwise accomplishes the objects initially set forth above.

What is claimed is:

1. In a cutting implement of the class described the combination of an elongated body member substantially rectangular in plan having an integral head end, a top and a flat bottom for sliding on the material being cut, a passageway in said body member integral head and extending obliquely transversely of the body member, said passageway having its opposed obliquely extending sides parallel, one of said passageway sides passing through the body member bottom substantially at the longitudinal center thereof, a cutter blade of a width substantially equal to the width of the passageway disposed in said oblique passageway, said cutter blade having dissimilar length sides joined by an upwardly extending end and having the longer side formed to a keen edge terminating in a point from which the upwardly extending cutter blade end extends and with said keen edge adjacent the side of the passageway that passes through the longitudinal center of the bottom so that the point is projected below the body member bottom at the longitudinal center thereof, means for securing said cutter blade in the passageway, said body member having a slot extending thereinto from said bottom behind the head end, a pivot block in the slot movable toward and from the body member head end, said pivot block having a top, bottom, sides and ends and being of a height and width substantially equal to the depth and width of the slot and when secured in position having its bottom flush with the bottom of the body member, means securing the pivot block in adjusted positions in and longitudinally of said slot, and means carried by said pivot block nearer one of its ends than the other and movable with said pivot block toward the body member head end and providing an axis on which the body member moves in actuating the cutter blade in an arc or circle.

2. In a cutting implement of the class described the combination of an elongated body member substantially rectangular in plan having an integral head end, a top and a flat bottom for sliding on the material being cut, a passageway in said body integral member head end extending obliquely transversely of the body member, said passageway having its opposed obliquely extending sides parallel, one of said passageway sides passing through the body member bottom substantially at the longitudinal center thereof, a cutter blade of a width substantially equal to the width of the passageway disposed in said oblique passageway, said cutter blade having dissimilar length sides joined by an upwardly extending end and having the longer side formed to a keen edge terminating in a point from which the upwardly extending cutter blade end extends and with said keen edge adjacent the side of the passageway that passes through the longitudinal center of the bottom so that the point is projected below the body member bottom at the longitudinal center thereof, means for securing said cutter blade in the passageway, said body member having a slot extending thereinto from said bottom behind the head end, a pivot block in the slot movable toward and from the body member head end, said pivot block having a top, bottom, sides and ends and being of a height and width substantially equal to the depth and width of the slot and when in position having its bottom flush with the bottom of the body member, means securing the pivot block in adjusted position in and longitudinally of said slot, comprising the body member having an elongated aperture therein from the top of less width than the slot and communicating with the slot, a clamp screw projecting from the pivot block through the aperture, and a clamp nut on said screw for clamping the pivot block top against the base of the slot laterally of the aperture and means carried by said pivot block nearer one of its ends than the other and movable with said pivot block toward the body member head end and providing an axis on which the body member moves in actuating the cutter blade in an arc or circle.

3. In a cutting implement of the class described the combination of an elongated body member substantially rectangular in plan having an integral head end, a top and a flat bottom for sliding on the material being cut, a passageway in said body member integral head end extending obliquely transversely of the body member, said passageway having its opposed obliquely extending sides parallel, one of said passageway sides passing through the body member bottom substantially at the longitudinal center thereof, a cutter blade of a width substantially equal to the width of the passageway disposed in said oblique passageway, said cutter blade having dissimilar length sides joined by an upwardly extending end and having the longer side formed to a keen edge terminating in a point from which the upwardly extending cutter blade end extends and with said keen edge adjacent the side of the passageway that passes through the longitudinal center of the bottom so that the point is projected below the body member bottom at the longitudinal center thereof, means for securing said cutter blade in the passageway, said body member having a slot extending therein from said bottom behind the head end, a pivot block in the slot movable toward and from the body member head end, said pivot block having a top, bottom, sides and ends and being of a height and width substantially equal to the depth and width of the slot and when secured in position having its bottom flush with the bottom of the body member, means securing the pivot block in adjusted position in said slot, comprising the body member having an elongated aperture therein from the top of less width than the slot and communicating with the slot, a clamp screw projecting from the pivot block through the aperture, and a clamp nut on said screw for clamping the pivot block top against the base of the slot laterally of the aperture and cooperating means providing an axis on which the body member moves in actuating the cutter blade in an arc or circle comprising said pivot block having a centering aperture therein nearer one of its ends than the other, a cutting board, a centering pin having a body portion disposed in said pivot block centering aperture and a pointed portion projecting from the pivot block, and said cutting board receiving the pointed end of the centering pin.

UNITED STATES PATENTS

References Cited in the file of this patent

| | | |
|---|---|---|
| 396,371 | Ross | Jan. 15, 1889 |
| 2,134,069 | Zimmerman | Oct. 25, 1938 |
| 2,161,978 | Rosenbaum | June 13, 1939 |
| 2,178,710 | Valiquette | Nov. 7, 1939 |
| 2,498,397 | Daly | Feb. 21, 1950 |
| 2,508,362 | Ballagh | May 23, 1950 |
| 2,546,292 | Bell | Mar. 27, 1951 |
| 2,547,789 | Skeel | Apr. 3, 1951 |